US012106887B2

(12) United States Patent
Mimura et al.

(10) Patent No.: US 12,106,887 B2
(45) Date of Patent: Oct. 1, 2024

(54) METHOD OF MANUFACTURING COIL COMPONENT HAVING TERMINAL ELECTRODES WITH HIGH MOUNTING STRENGTH

(71) Applicant: TAIYO YUDEN CO., LTD., Tokyo (JP)

(72) Inventors: Daiki Mimura, Takasaki (JP); Toshiyuki Yagasaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 910 days.

(21) Appl. No.: 16/945,368

(22) Filed: Jul. 31, 2020

(65) Prior Publication Data

US 2020/0365314 A1 Nov. 19, 2020

Related U.S. Application Data

(60) Division of application No. 16/222,878, filed on Dec. 17, 2018, now Pat. No. 10,770,221, which is a (Continued)

(30) Foreign Application Priority Data

Jul. 29, 2014 (JP) ................................ 2014-154343

(51) Int. Cl.
*H01F 7/06* (2006.01)
*H01F 17/00* (2006.01)
(Continued)

(52) U.S. Cl.
CPC ......... *H01F 27/29* (2013.01); *H01F 17/0006* (2013.01); *H01F 27/28* (2013.01);
(Continued)

(58) Field of Classification Search
CPC ...... H01F 41/04; H01F 41/042; H01F 41/046; H01F 27/28; H01F 27/29; H01F 27/327; H01F 17/0006
See application file for complete search history.

(56) References Cited

U.S. PATENT DOCUMENTS 4,927,771 A * 5/1990 Ferrett .............. H01L 27/14881
257/E27.161
8,174,349 B2 * 5/2012 Yoshida .................. H01G 4/33
336/200
(Continued)

FOREIGN PATENT DOCUMENTS

JP WO2003075295 A1 9/2003
JP 2010087240 A 4/2010
(Continued)

OTHER PUBLICATIONS

A Notification of Reason for Refusal issued by Korean Intellectual Property Office, mailed Jan. 3, 2017, for Korean counterpart application No. 1020150095717 (7 pages).
(Continued)

*Primary Examiner* — Paul D Kim
(74) *Attorney, Agent, or Firm* — Law Office of Katsuhiro Arai

(57) ABSTRACT

A method of manufacturing a coil component having terminal electrodes with high mounting strength, includes: embedding an air-core coil in complex magnetic material being a mixture of resin and metal magnetic grains, molding the magnetic material so that both ends of the coil are exposed on its surface, curing the resin in the molding, thereby obtaining a magnetic body in which the coil is embedded, polishing and etching a surface where the ends of the coil are exposed, sputtering metal material onto an etched surface of the magnetic body, thereby forming an underlying layer across a surface of the magnetic body and
(Continued)

ends of the coil, and then forming a cover layer that covers an outer side of the underlying layer, thereby forming terminal electrodes constituted by the underlying layer and cover layer.

11 Claims, 3 Drawing Sheets

Related U.S. Application Data continuation of application No. 15/636,547, filed on Jun. 28, 2017, now Pat. No. 10,192,674, which is a continuation of application No. 14/811,472, filed on Jul. 28, 2015, now Pat. No. 9,728,316.

(51) Int. Cl.
*H01F 27/28* (2006.01)
*H01F 27/29* (2006.01)
*H01F 27/32* (2006.01)
*H01F 41/04* (2006.01)

(52) U.S. Cl.
CPC ........... *H01F 27/327* (2013.01); *H01F 41/04* (2013.01); *H01F 41/042* (2013.01); *H01F 41/046* (2013.01)

(56) References Cited

U.S. PATENT DOCUMENTS

| | | | |
|---|---|---|---|
| 9,576,722 B2 * | 2/2017 | Watanabe ........... H01F 17/0013 |
| 2005/0083637 A1 | 4/2005 | Yoshll et al. |
| 2010/0259353 A1 | 10/2010 | Saito et al. |
| 2011/0037557 A1 | 2/2011 | Konoue et al. |
| 2011/0227690 A1 | 9/2011 | Watanabe et al. |
| 2012/0188046 A1 | 7/2012 | Matsuura et al. |
| 2013/0255071 A1 | 10/2013 | Muneuchi et al. |
| 2013/0307655 A1 | 11/2013 | Saito et al. |
| 2015/0001998 A1 | 1/2015 | Katsuta et al. |
| 2015/0162122 A1 * | 6/2015 | Park ...................... H01F 27/292 29/605 |
| 2016/0012961 A1 | 1/2016 | Suzuki et al. |
| 2016/0012962 A1 | 1/2016 | Lee et al. |
| 2017/0084385 A1 | 3/2017 | Ida |
| 2017/0178793 A1 | 6/2017 | Muneuchi |

FOREIGN PATENT DOCUMENTS

| | | |
|---|---|---|
| JP | 2013045926 A | 3/2013 |
| JP | 2013145866 A | 7/2013 |
| KR | 1020100101012 A | 9/2010 |
| KR | 1020110090979 A | 8/2011 |
| KR | 1020120084657 A | 7/2012 |
| KR | 1020130111452 A | 10/2013 |

OTHER PUBLICATIONS

Non-Final Office Action issued by U.S. Patent and Trademark Office, dated Apr. 6, 2018, for U.S. Appl. No. 15/636,547 (10 pages).
Non-Final Office Action issued by U.S. Patent and Trademark Office, dated Oct. 31, 2016, for U.S. Appl. No. 14/811,472 (15 pages).
Notice of Allowance issued by U.S. Patent and Trademark Office, dated May 29, 2020, for U.S. Appl. No. 16/222,878 (15 pages).
Notice of Allowance issued by U.S. Patent and Trademark Office, dated May 3, 2017, for U.S. Appl. No. 14/811,472 (13 pages).
Notice of Allowance issued by U.S. Patent and Trademark Office, dated Sep. 19, 2018, for U.S. Appl. No. 15/636,547 (8 pages).

* cited by examiner

[Fig.1]
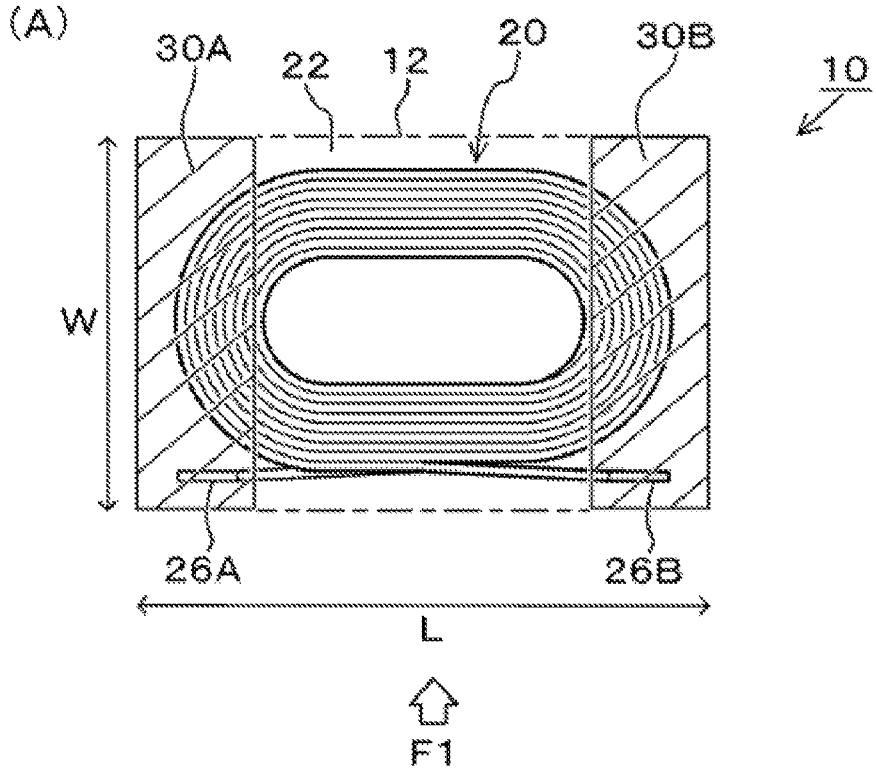
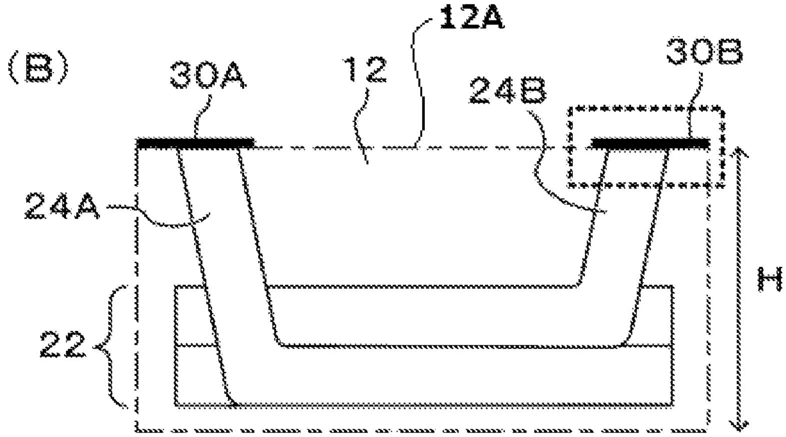

[Fig.2]
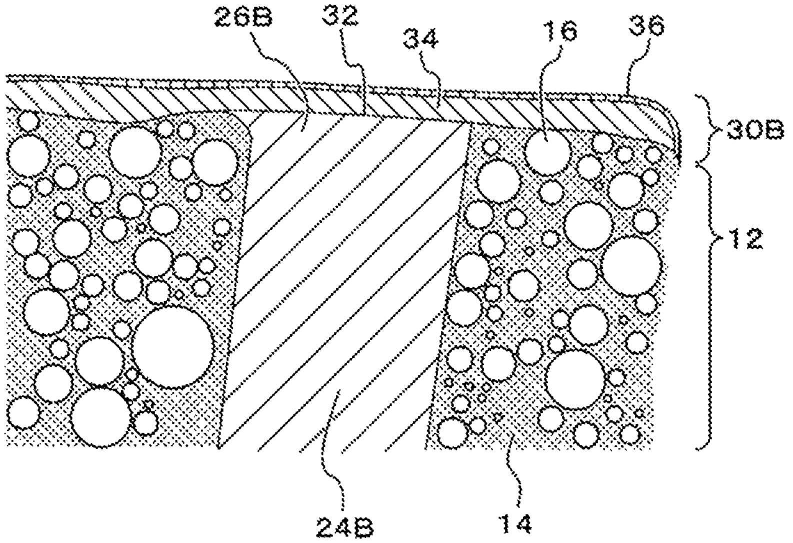
[Fig.3]
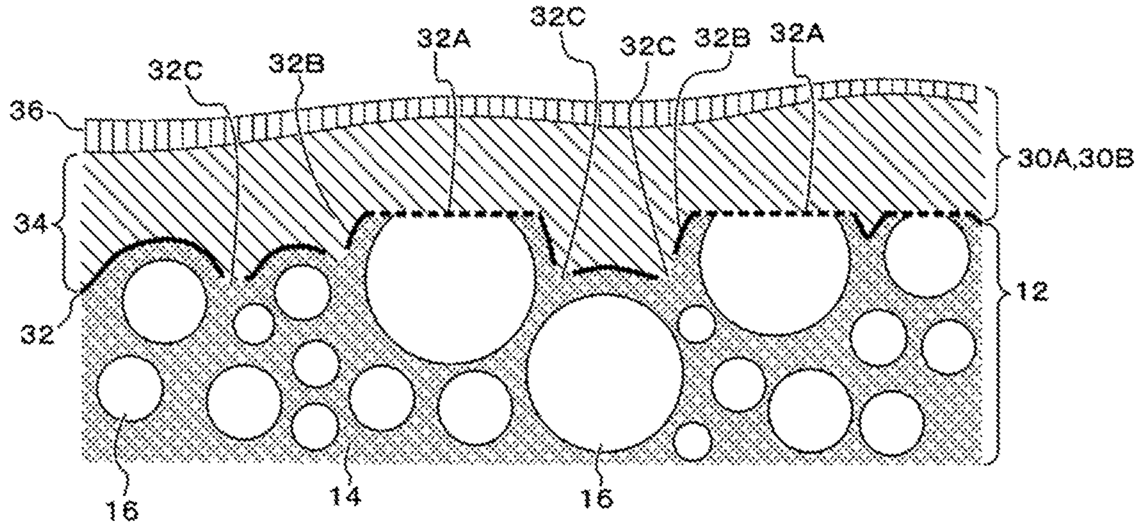

[Fig.4]
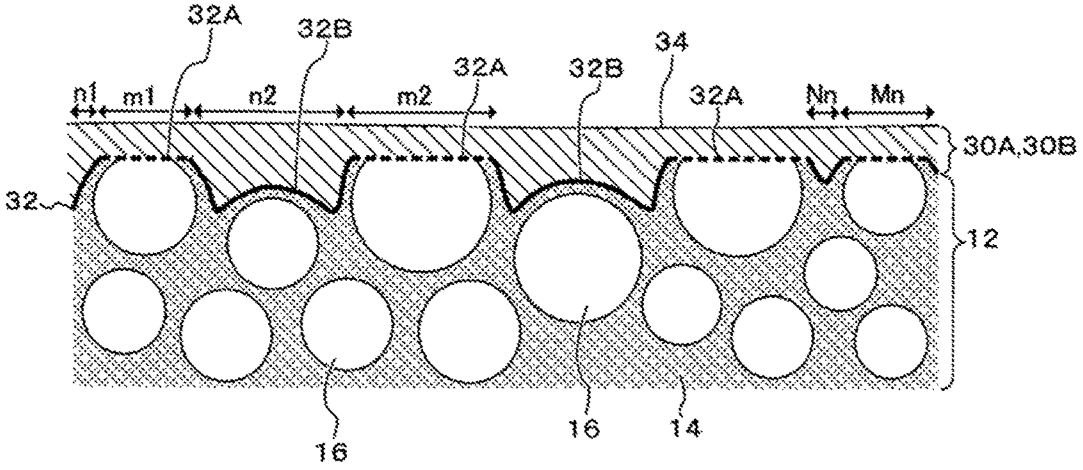
[Fig. 5]
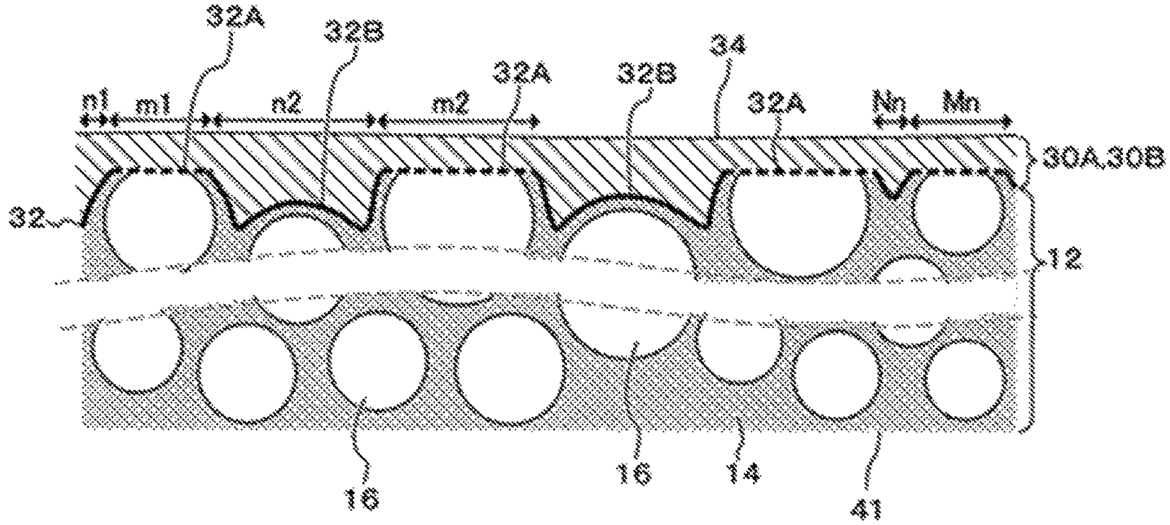

METHOD OF MANUFACTURING COIL COMPONENT HAVING TERMINAL ELECTRODES WITH HIGH MOUNTING STRENGTH

CROSS-REFERENCE TO RELATED APPLICATIONS

This application is a divisional of U.S. patent application Ser. No. 16/222,878, filed Dec. 17, 2018, now U.S. Pat. No. 10,770,221, which is a continuation of U.S. patent application Ser. No. 15/636,547, filed Jun. 28, 2017, now U.S. Pat. No. 10,192,674, which is a continuation of U.S. patent application Ser. No. 14/811,472, filed Jul. 28, 2015, now U.S. Pat. No. 9,728,316, which claims priority to Japanese Patent Application No. 2014-154343, filed Jul. 29, 2014, each disclosure of which is herein incorporated by reference in its entirety. The applicant herein explicitly rescinds and retracts any prior disclaimers or disavowals made in any parent, child or related prosecution history with regard to any subject matter supported by the present application.

BACKGROUND

Field of the Invention

The present invention relates to a coil component, manufacturing method thereof, and electronic device, and more specifically to a coil component having terminal electrodes directly mounted to a magnetic body, manufacturing method thereof, and electronic device.

Description of the Related Art

As mobile devices and other electronic devices offer increasingly higher performance, high performance is also required of components used in electronic devices. Accordingly, use of metal material is being investigated because it allows for desired current characteristics to be obtained more easily than when ferrite material is used, and there are also a growing number of coil components of the type where metal material is solidified with resin and an air-core coil is embedded in a magnetic body in order to take advantage of the characteristics of metal material.

As for coil components of the type where an air-core coil is embedded in metal material, relatively large ones adopt a method of using the conductive wire of the coil as terminal electrodes, as shown in FIG. 1 of Patent Literature 1 cited below. Other methods include one, for example, where metal sheets are mounted to the conductive wire for use as frame terminals, as shown in FIG. 1 of Patent Literature 2 cited below, and this has been the mainstream method from the viewpoints of dimensional flexibility and terminal strength.

Any discussion of problems and solutions involved in the related art has been included in this disclosure solely for the purposes of providing a context for the present invention, and should not be taken as an admission that any or all of the discussion were known at the time the invention was made.

BACKGROUND ART LITERATURES

[Patent Literature 1] Japanese Patent Laid-open No. 2013-145866 (FIG. 1)

[Patent Literature 2] Japanese Patent Laid-open No. 2010-087240 (FIG. 1)

SUMMARY

However, both of the methods mentioned above entail constraints regarding the thickness of the conductive wire in order to allow for bending, joining, etc., and these constraints mean that large space is needed and thus pursuing size reduction becomes difficult. In addition, terminal electrodes that are formed by baking a conductive paste used for ceramic components cannot be used with a magnetic body formed with resin. Furthermore, use of terminal electrodes made by thermally curing a conductive paste leads to higher resistance due to the presence of resin, which makes it difficult to pursue resistance reduction—another requirement along with high current characteristics.

The present invention focuses on the aforementioned point, and one object of the present invention is to provide a coil component having terminal electrodes directly mounted to the surface of a magnetic body, wherein such coil component does not entail any constraints regarding the thickness of the conductor that forms the coil, offers good adhesion to the terminal electrodes and high mounting strength, and also allows for resistance reduction and size reduction, as well as a method of manufacturing such coil component. Another object of the present invention is to provide an electronic component using such coil component.

The coil component proposed by the present invention is a coil component comprising an air-core coil embedded in a magnetic body constituted by resin and metal magnetic grains, and having terminal electrodes electrically connected to both ends of the coil; wherein such coil component is characterized in that: both ends of the coil are exposed on the surface of the magnetic body; the terminal electrodes are formed across the surface of the magnetic body and ends of the coil, and also constituted by an underlying layer formed with metal material and a cover layer placed on the outer side of the underlying layer; and the underlying layer is in contact with the resin and metal magnetic grains where it is in contact with the magnetic body.

One key embodiment is characterized in that, where the underlying layer is in contact with the magnetic body, the ratio of the areas where the underlying layer is in contact with the metal magnetic grains is greater than the ratio of the areas where the underlying layer is not in contact with the metal magnetic grains. Another embodiment is characterized in that the metal magnetic grains of the magnetic body include two or more types of metal magnetic grains of different grain sizes.

Yet another embodiment is characterized in that the metal material that forms the underlying layer contains (1) one of Ag, Cu, Au, Al, Mg, W, Ni, Fe, Pt, Cr, and Ti, or contains (2) at least Ag or Cu. Yet another embodiment is characterized in that the cover layer is formed with Ag or conductive resin containing Ag.

Yet another embodiment is characterized in that a protective layer covering the outer side of the cover layer is provided. Yet another embodiment is characterized in that the protective layer is formed with Ni and Sn. Yet another embodiment is characterized in that the magnetic body surface on the side where the terminal electrodes are formed contains less resin than the magnetic body surface on the side where the terminal electrodes are not formed. Yet another embodiment is characterized in that, on the magnetic body surface where the terminal electrodes are not formed, phosphorus is contained at least in some areas of the surface. Yet another embodiment is characterized in that, on the magnetic body surface where the terminal electrodes are not formed, at least some areas of the surface are covered with resin that contains an oxide filler whose grain size is smaller than that of the metal grains.

The method of manufacturing a coil component as proposed by the present invention is characterized in that it includes: a step to embed an air-core coil in complex magnetic material being a mixture of resin and metal magnetic grains, mold the magnetic material so that both ends of the coil are exposed on its surface, and cure the resin in the molding, to obtain a magnetic body in which the coil is embedded; a step to polish and etch the surface where the ends of the coil are exposed; and a step to sputter metal material onto the surface etched in the previous step to form an underlying layer across the surface of the magnetic body and ends of the coil, and then form a cover layer that covers the outer side of the underlying layer, to form terminal electrodes constituted by the underlying layer and cover layer. One key embodiment is characterized in that a step to form a protective layer that covers the cover layer is included.

Another coil component according to the present invention is characterized in that it is formed using one of the manufacturing methods described above, and that the underlying layer is in contact with the resin and metal magnetic grains where it is in contact with the magnetic body.

An electronic device according to the present invention is characterized in that it has one of the coil components described above. The aforementioned and other objects, characteristics, and benefits of the present invention are made clear in the detailed explanations below and the drawings attached hereto.

According to the present invention, an air-core coil is embedded in a magnetic body constituted by resin and metal magnetic grains, both ends of the coil are exposed on the end faces of the magnetic body, and terminal electrodes are electrically connected to both exposed ends. The terminal electrodes are constituted by an underlying layer formed with metal material and a cover layer placed on the outer side of the underlying layer, and formed across the surface of the magnetic body and ends of the coil, where the underlying layer is in contact with the resin and metal magnetic grains where it is in contact with the magnetic body. The result is a coil component having terminal electrodes directly mounted to the surface of a magnetic body, which offers good adhesion between the magnetic body and terminal electrodes as well as high mounting strength, and also because the cover layer is made with metal material free from resin, etc., the resistance of the cover layer can be lowered. As a result, a thin conductive wire can be used to reduce the area of the coil ends, which in turn allows for resistance reduction and size reduction.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1 shows drawings showing the coil component in Example 1 of the present invention, where (A) is a plan view of the coil component as viewed from the side where the terminal electrodes are formed, while (B) is a side view of (A) above as viewed from the direction of the arrow F1.

FIG. 2 is a drawing showing Example 1 above, being a schematic diagram showing a partially enlarged view of FIG. 1 (B).

FIG. 3 is a drawing showing Example 1 above, being a schematic diagram showing an enlarged view of an example of the interface between the magnetic body and terminal electrode.

FIG. 4 is a drawing showing Example 1 above, being a schematic diagram showing an enlarged view of another example of the interface between the magnetic body and terminal electrode.

FIG. 5 is a schematic diagram showing an enlarged view of a bottom portion of the magnetic body and terminal electrode shown in FIG. 4.

DESCRIPTION OF THE SYMBOLS

10: Coil component
12: Magnetic body
14: Resin
16: Metal magnetic grains
20: Air-core coil
22: Turned area
24A, 24B: Leader part
26A, 26B: End
30A, 30B: Terminal electrode
32: Underlying layer
32A: Metal-contacting area
32B: Resin-contacting area
32C: Non-contacting area
34: Cover layer
36: Protective layer

DETAILED DESCRIPTION OF EMBODIMENTS

Preferable embodiments for carrying out the present invention are explained in detail below based on examples.

Example 1

First, Example 1 of the present invention is explained by referring to FIGS. 1 and 2. FIG. 1 provides drawings showing the coil component in this example, where (A) is a plan view of the coil component as viewed from the side where terminal electrodes are formed, while (B) is a side view of (A) above as viewed from the direction of the arrow F1. FIG. 2 is a schematic diagram showing a partially enlarged view of FIG. 1 (B). FIGS. 3 and 4 are schematic diagrams, each showing an enlarged view of the interface between the magnetic body and terminal electrode. As shown in FIG. 1 (A), a coil component 10 in this example is constituted by an air-core coil 20 embedded in a rectangular solid magnetic body 12. The magnetic body 12 is constituted by resin 14 and metal magnetic grains 16. Or, lubricant may also be contained. Exposed on the bottom side of the magnetic body 12 are ends 26A, 26B of both leader parts 24A, 24B of the air-core coil 20, and terminal electrodes 30A, 30B are electrically connected to the exposed ends 26A, 26B. Under the present invention, the terminal electrodes 30A, 30B are directly mounted to the end faces of the magnetic body 12 (on the bottom side in the example shown).

The terminal electrodes 30A, 30B are formed across the ends 26A, 26B of the air-core coil 20, respectively, and part of the surface of one side of the magnetic body 12, and are constituted by an underlying layer 32 formed with metal material and a cover layer 34 placed on the outer side of the underlying layer 32 (refer to FIG. 4). Also, a protective layer 36 may be formed on top of the cover layer 34, if necessary (refer to FIGS. 2 and 3). Then, as shown in FIG. 2, the underlying layer 32 is in contact with the ends 26A, 26B of the air-core coil 20, and in contact with the resin 14 constituting the magnetic body 12 and metal magnetic grains 16 constituting the magnetic body 12, respectively.

For the material constituting each part mentioned above, epoxy resin is used for the resin 14 constituting the magnetic body 12, for example. For the metal magnetic grains 16, FeSiCrBC may be used, for example. Also, grains of different grain sizes may be used, such as FeSiCrBC and Fe. An insulation-sheathed conductive wire is used for the conductive wire that forms the air-core coil 20. The insulation sheath may be polyester imide, urethane, etc., but it can be polyamide imide or polyimide offering high heat resistance. In addition, the underlying layer 32 of the terminal electrodes 30A, 30B is formed by one of Ag, Cu, Au, Al, Mg, W, Ni, Fe, Pt, Cr, and Ti, or any combination thereof, for example. Ag or conductive resin containing Ag is used for the cover layer 34, while Ni and Sn are used for the protective layer 36, for example.

Next, the method of manufacturing the coil component 10 in this example is explained. The air-core coil 20 formed by the aforementioned materials is embedded in complex magnetic material being a mixture of resin 14 and metal magnetic grains 16, and the magnetic material is molded so that both ends 26A, 26B of the air-core coil 20 are exposed on the surface. The air-core coil 20 is a wound conductive wire, for example, but a planar coil can be used instead of a wound wire and the coil is not limited in any way. Then, by curing the resin 14 in the molding, a magnetic body 12 in which the air-core coil 20 is embedded is obtained. Next, the surfaces where the ends 26A, 26B of the air-core coil 20 are exposed are polished and etched. Any etching method may be used so long as it can remove the oxides on the surface of the magnetic body 12.

Next, terminal electrodes 30A, 30B are formed. Metal material is sputtered onto the aforementioned etched side to form an underlying layer 32 across the surface of the magnetic body 12 and ends 26A, 26B of the coil, and then a cover layer 34 that covers the outer side of it is formed to form terminal electrodes 30A, 30B. In other words, the terminal electrodes 30A, 30B are directly mounted to the magnetic body 12 in this example. To be more specific, a sputtering machine is used to form an underlying layer 32 in an ambience of argon, with the etched side of the magnetic body 12 oriented toward the target side. Here, it is desirable that oxidation of the underlying layer 32 be suppressed. If a cover layer 34 is to be formed next using the sputtering method, sputtering is performed continuously after the underlying layer 32 has been formed, in order to suppress oxidation of the underlying layer 32. Also, a different method can be adopted for the cover layer 34, such as one where a conductive paste is applied and then resin in the paste is cured.

In addition, a protective layer 36 may be formed further on the outer side of the cover layer 34. The protective layer 36 can be formed on top of the cover layer 34 by means of Ni- and Sn-plating, for example, as it provides a component with good solder wettability. Furthermore, the surface (12A in FIG. 1 (B)) of the magnetic body 12 except for the cover layer 34 (except areas under the terminal electrodes 30A, 30B in FIG. 1 (B)) can be given insulation treatment before plating so that the plating can be formed in a more stable manner. Specific methods include phosphoric acid treatment and resin coating treatment, among others.

To be more specific, the terminal electrodes 30A, 30B permit several combinations. For example, as shown in FIG. 4, smoothness of the etched side of the magnetic body 12 allows the underlying layer 32 and cover layer 34 to be formed thin while still allowing thin, easily-mountable terminal electrodes 30A, 30B to be obtained without flaws. This is characterized in that, as shown in FIG. 4, metal contacting areas 32A and resin contacting areas 32B of the underlying layer 32 exist continuously without breaking, which permits thin terminal electrodes. On the other hand, as shown in FIG. 3, if smoothness of the etched side of the magnetic body 12 is not good, it prevents the underlying layer 32 from being formed in concaved parts of the magnetic body 12 (refer to the non-contacting areas 32C in the same figure) and makes the layer partially broken. In this case, a conductive paste containing resin 14 to be cured can be used for the cover layer 34, to obtain terminal electrodes 30A, 30B that are easily mountable and also have high mounting strength.

In other words, while a conventional magnetic body formed with resin has its surface covered with resin, under the present invention a magnetic body 12 is constituted by resin 14 and metal magnetic grains 16 and metal parts of the metal magnetic grains 16 are exposed at the magnetic body surface where terminal electrodes are formed, and then an underlying layer (metal layer) of the terminal electrodes is formed on this surface so that the underlying layer 32 of the terminal electrodes contacts the metal parts of the metal magnetic grains 16. This way, the underlying layer 32 ensures insulation where it is in contact with the resin 14 (resin contacting areas 32B), while ensuring adhesion where it is in contact with the metal parts of the metal magnetic grains 16 (metal contacting areas 32A). As a result, direct-mounted terminal electrodes 30A, 30B offering high mounting strength can be obtained. Particularly when the underlying layer 32 is formed with metal material free from resin, the resistance can be lowered to achieve reliable connection even when the connection areas with the ends 26A, 26B of the air-core coil 20 are small, which means that a small coil component can be produced as there is no constraint regarding the thickness of the conductor that forms the air-core coil 20.

<Experiment Examples>—Next, experiment examples and a comparative example are explained, which were made to check how changes in the conditions of the respective parts constituting the coil component under the present invention would affect the resistance and mounting strength of the coil component. The coil components of Experiment Examples 1 to 8 and Comparative Example 1 were produced according to the conditions shown in Table 1 below, and measured for resistance and mounting strength. The product size of each coil component was adjusted so that L×W×H in FIG. 1 would become 3.2×2.5×1.4 mm. Also, the complex magnetic material was obtained by mixing metal magnetic grains of FeSiCrBC or FeSiCrBC and Fe, with epoxy resin. In addition, the air-core coil 20 used a rectangular wire with polyamide imide film whose section size was 0.4×0.15 mm, and was turned 10.5 times in the turned area 22.

In addition, the sputter-formed underlying layer 32 of terminal electrodes 30A, 30B used one of Ag, Ti, TiCr, and AgCu alloys, while the cover layer 34 used one of Ag, resin containing Ag and resin containing AgCu. Furthermore, the protective layer 36, if formed, used Ni and Sn. Then, the terminal electrodes 30A, 30B were formed at both ends of the bottom side of the magnetic body 12, each to a size of 0.8×2.5 mm.

The complex magnetic material was molded at a temperature of 150° C., and the molding was removed from the metal molds and then cured at 200° C., to obtain a magnetic body 12. The magnetic body 12 was etched after polishing the magnetic body surface using polishing agent (25 μm). Here, ion milling was used, which is a type of dry etching method. It should be noted that the purpose is to remove surface contaminants on the magnetic body 12 and cut faces of the wire to reduce oxides on the surface, and plasma etching can also be used.

32 and cover layer 34 were changed, and the sputtering method was used to form AgCu alloy to a thickness of 1 μm, and a conductive paste was applied to eliminate any effects of the concaves in the magnetic body 12 (refer to the non-contacting areas 32C in FIG. 3) and then thermally cured to a thickness of 50 μm. Here, plating was not performed because the conductive paste containing AgCu metal grains was used. Furthermore, in Experiment Example 8, the underlying layer 32 was formed with Ag to a thickness of 1 μm, no cover layer was provided, and the protective layer 36 was formed with Ni and Sn to a thickness of 2 μm and 5 μm, respectively.

The A/B ratio in Table 1 above indicates the ratio of magnetic grains expressed by the ratio of the respective magnetic grains in percent by volume. The resin content indicates the ratio of resin to magnetic grains in percent by weight. Also, the surface accuracy is expressed by the surface roughness Ra, while the magnetic grain (metal

TABLE 1

| | Magnetic body | | | | | | | | Electrode material | | | | | |
|---|---|---|---|---|---|---|---|---|---|---|---|---|---|---|
| | | | | | | | Surface accuracy Surface roughness Ra | Magnetic grain exposure/ Grains/ magnetic body | Underlying layer | | Cover layer | | Protective layer | |
| | Magnetic grains A | Grain size [μm] | Magnetic grains B | Grain size [μm] | A/B ratio | Resin content [wt %] | [μm] | [%] | Material | [μm] | Material | [μm] | Material | [μm] |
| Comparative Example 1 | FeSiCrBC | 10 | — | — | — | 5 | 0.1 | 0 | Ti | 0.05 | Ag | 1 | Ni + Sn | 7 |
| Experiment Example 1 | FeSiCrBC | 10 | — | — | — | 5 | 0.5 | 40 | Ti | 0.05 | Ag | 1 | Ni + Sn | 7 |
| Experiment Example 2 | FeSiCrBC | 10 | — | — | — | 15 | 0.3 | 41 | TiCr | 0.05 | Ag | 1 | Ni + Sn | 7 |
| Experiment Example 3 | FeSiCrBC | 10 | — | — | — | 17 | 0.2 | 42 | Ti | 1 | Ag | 1 | Ni + Sn | 7 |
| Experiment Example 4 | FeSiCrBC | 20 | Fe | 5 | 1 | 5 | 2.1 | 51 | Ti | 0.05 | Ag | 1 | Ni + Sn | 7 |
| Experiment Example 5 | FeSiCrBC | 15 | Fe | 5 | 1.5 | 5 | 5.8 | 63 | Ti | 0.05 | Resin containing Ag | 30 | Ni + Sn | 7 |
| Experiment Example 6 | FeSiCrBC | 15 | Fe | 3 | 4 | 5 | 6.1 | 69 | Ag | 1 | Resin containing Ag | 30 | Ni + Sn | 7 |
| Experiment Example 7 | FeSiCrBC | 15 | Fe | 3 | 4 | 5 | 6.1 | 70 | AgCu | 1 | Resin containing AgCu | 50 | — | — |
| Experiment Example 8 | FeSiCrBC | 15 | Fe | 3 | 4 | 5 | 6.1 | 70 | Ag | 1 | — | — | Ni + Sn | 7 |

In Experiment Example 1, the underlying layer 32 was formed with Ti to a thickness of 0.05 μm using the sputtering method, after which the cover layer 34 was formed with Ag to a thickness of 1 μm. Next, the protective layer 36 was formed by Ni- and Sn-plating to a thickness of 2 μm and 5 μm, respectively. Experiment Examples 2 and 3 are the same as Experiment Example 1, except that the underlying layer 32 was formed with Ti and Cr in the former and the thickness of the underlying layer was 0.1 μm in the latter. In Comparative Example 1, terminal electrodes identical to those in Experiment Example 1 were formed without polishing the magnetic body 12.

In Experiment Examples 4 to 8, two types of magnetic grains including magnetic grains A of larger grain size (FeSiCrBC) and magnetic grains B of smaller grain size (Fe) were used, and the materials and thicknesses of the underlying layer 32 and cover layer 34 were varied. Also, in Experiment Example 7, the materials of the underlying layer magnetic grain) exposure is expressed by "Grains/magnetic body [%]." The magnetic grain exposure was calculated by observing the interface between the underlying layer 32 and magnetic body 12 and examining whether oxygen or carbon was detected or not by EDS-mapping, at 1000 magnifications, the interface between the underlying layer 32 and magnetic body 12 in a section of the sample, and concluding that areas where neither oxygen nor carbon was present were in contact with the magnetic grains, while areas where either oxygen or carbon was present was in contact with the resin. The areas contacting the magnetic grains thus identified (m1, m2 . . . , Mn in FIG. 4) were converted to straight lines, respectively, and their lengths were measured, while similarly the areas contacting the resin (n1, n2 . . . , Nn in FIG. 4) were converted to straight lines, respectively, and their lengths were measured, and the total sum of lengths was obtained. The magnetic grain exposure ratio in Table 1 represents the ratio of the lengths of the areas contacting the magnetic grains, to the total sum. Shown in Table 2 below are the results of measuring the coil components in Experiment Examples 1 to 8 and Comparative Example 1, produced above, for resistance and mounting strength. Resistance was measured as the direct-current resistance between the terminal electrodes 30A, 30B at both ends, while mounting strength was measured as the peel strength of the component solder-mounted on a board.

TABLE 2

| | Resistance [mΩ] | Mounting strength [kgf] |
|---|---|---|
| Comparative Example 1 | 18.0 | 0.1 |
| Experiment Example 1 | 17.9 | 2.1 |
| Experiment Example 2 | 18.0 | 2.0 |
| Experiment Example 3 | 18.5 | 2.6 |
| Experiment Example 4 | 18.0 | 3.2 |
| Experiment Example 5 | 18.2 | 3.4 |
| Experiment Example 6 | 16.9 | 3.7 |
| Experiment Example 7 | 17.0 | 3.6 |
| Experiment Example 8 | 16.7 | 3.0 |

The results in Table 2 confirm that, compared to Comparative Example 1 where the terminal electrodes 30A, 30B were formed after forming the magnetic body 12 but without polishing it, the mounting strength in Experiment Example 1 where polishing was performed was significantly higher. Also when the metal materials forming the underlying layer 32 were examined, sufficient mounting strength could be ensured even when the material included Ti and Cr (Experiment Example 2). Furthermore, increasing the thickness of the underlying layer 32 (Experiment Example 3) led to higher mounting strength.

In Experiment Examples 4 to 7 where magnetic grains A of larger grain size and magnetic grains B of smaller grain size were used, the mounting strength was even higher than when magnetic grains A of larger grain size alone were used. This is probably because use of magnetic grains of different grain sizes increased the ratio of contact between the underlying layer 32 and metal magnetic grains 16, which permits a thin underlying layer 32.

Next, when the metal material forming the underlying layer 32 contained at least Ag or Cu (Experiment Examples 6 to 8), the resistance became lower and sufficient adhesion was ensured, compared to when the metal material contained neither (Experiment Examples 2 to 5). As for the material of the cover layer 34, forming it with conductive resin containing Ag (Experiment Examples 5 to 7) led to higher mounting strength. Particularly when no cover layer was provided (Experiment Example 8), the same mounting strength was achieved with smaller thickness and lower resistance.

As described above, the following effects are achieved in the examples:

(1) A magnetic body 12 in which an air-core coil 20 is embedded is constituted by resin 14 and metal magnetic grains 16, and metal parts of the metal magnetic grains 16 are exposed at the magnetic body surface where terminal electrodes 30A, 30B are formed. And, because the underlying layer 32 of the terminal electrodes 30A, 30B is formed with metal material on the magnetic body surface, the underlying layer 32 contacts the exposed surfaces of the metal magnetic grains 16. This way, the underlying layer 32 ensures insulation where it is in contact with the resin 14, while ensuring adhesion where it is in contact with the exposed parts of the metal magnetic grains 16. As a result, direct-mounted terminal electrodes 30A, 30B offering high mounting strength are obtained.

(2) By forming the underlying layer 32 with metal material free from resin, the resistance becomes lower and reliable connection is achieved even when the connection areas with the ends 26A, 26B of the coil 20 are small, which means that a small coil component 10 can be produced as there is no constraint regarding the thickness of the conductor that forms the coil 20.

(3) By using Ni and Sn to form the protective layer 36 that covers the cover layer 34, good solder wettability is achieved.

(4) By setting the ratio of the areas where the underlying layer 32 is in contact with the metal magnetic grains 16 greater than the ratio of the areas where the underlying layer 32 is not in contact with the metal magnetic grains 16 (areas where it is in contact with the resin 14), the mounting strength can be increased.

(5) By using metal magnetic grains 16 of different grain sizes, the ratio of the areas where the underlying layer 32 is in contact with the metal magnetic grains increases and the mounting strength can be increased further.

(6) By selecting appropriate materials to form the underlying layer 32 and cover layer 34, it becomes possible to ensure sufficient mounting strength with thinner terminal electrodes 30A, 30B and lower resistance, or ensure sufficient adhesion, or the like.

It should be noted that the present invention is not limited to the aforementioned examples and various changes can be added so long as they do not deviate from the main purpose of the present invention. For example, the following are also included in the present invention:

(1) The shapes, dimensions and materials shown in the above examples are only examples and can be changed as deemed necessary.

(2) While the terminal electrodes 30A, 30B were formed on the bottom side of the coil component 10 in the above examples, this is also one example and can be changed as deemed necessary.

(3) While an air-core coil 20 using a rectangular wire was shown in the above examples, this is also one example and the section shape of the conductor forming the coil, shape of the coil itself, and number of turns in the turned area of the coil, can also be changed as deemed necessary.

(4) By reducing the resin content of the magnetic body surface on the side where the terminal electrodes 30A, 30B are formed (as shown in FIG. 4, for example), compared to the magnetic body surface on the side where the terminal electrodes 30A, 30B are not formed (such as a bottom face 41 in FIG. 5), good insulation property is achieved on the side of higher resin content, along with resistance to rust.

(5) By setting the magnetic body surface on which the terminal electrodes 30A, 30B are not formed, to contain phosphorus at least in some areas, the insulation property can be raised further, plating can be performed in a stable manner, and dimension accuracy of the terminal electrodes 30A, 30B can be increased.

(6) By covering the magnetic body surface on which the terminal electrodes 30A, 30B are not formed, at least in some areas, with resin containing an oxide filler whose grain size is smaller than that of the metal magnetic grains 16, the smoothness of the magnetic body surface can be improved and insulation property can be increased.

According to the present invention, an air-core coil is embedded in a magnetic body constituted by resin and metal magnetic grains, and both ends of the coil are exposed on the end faces of the magnetic body, with terminal electrodes electrically connected to both exposed ends. The terminal electrodes are constituted by an underlying layer formed with metal material and a cover layer placed on the outer side of the underlying layer, and formed across the surface of the magnetic body and ends of the coil, where the underlying layer is in contact with the resin and metal magnetic grains where it is in contact with the magnetic body. This leads to good adhesion between the magnetic body and terminal electrodes and high mounting strength, and also allows for resistance reduction and size reduction because there is no constraint regarding the thickness of the conductor that forms the coil, and consequently the present invention can be applied to a coil component whose terminal electrodes are directly mounted to the surface of a magnetic body, and an electronic device utilizing such coil component.

In some embodiments, where the underlying layer is in contact with the magnetic body, the ratio of areas where the underlying layer is in contact with the metal magnetic grains, and the ratio of areas where the underlying layer is not in contact with the metal magnetic grains, relative to the observed areas, are calculated by observing a cross section of an interface between the underlying layer and the magnetic body randomly selected from images of EDS (Energy Dispersion Spectroscopy) mapping at 1,000 magnifications, for example, wherein the areas are represented by straight lines drawn along the interface, and the ratios are calculated based on the lengths of the corresponding straight lines. Also, in some embodiments, the amount of resin on a surface of the magnetic body can be determined using a method similar to that described above. In some embodiments, the metal magnetic grains of the magnetic body are constituted by two or more types of metal magnetic grains of different grain sizes, wherein each type has a different main peak of particle size distribution, and thus, if multiple types of metal magnetic grains are used, the mixed metal magnetic grains have the same number of main peaks of particle size distribution as the number of grain types, which can readily be observed based on a particle size distribution analysis by a skilled artisan in the art.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A method of manufacturing a coil component comprising:

a step comprising embedding an air-core coil in a complex magnetic material which is a mixture of a resin and metal magnetic grains; molding the magnetic material in a manner that both ends of the coil are exposed on a surface of the magnetic material; and curing the resin in the molded magnetic material, to obtain a magnetic body in which the coil is embedded;

a step comprising polishing a surface of the magnetic body on which the ends of the coil are exposed, to form a polished surface of the magnetic body, whereby a surface roughness of the polished surface of the magnetic body is increased wherein some of the metal magnetic grains are exposed on the polished surface of the magnetic body wherein there are concaves between the some of the exposed metal magnetic grains adjacent to each other, said concaves being exposed on the polished surface of the magnetic body, the step comprising polishing being followed by dry-etching the polished surface of the magnetic body to remove oxides on the polished surface of the magnetic body, thereby forming a polished and dry-etched surface of the magnetic body; and a step comprising sputtering a metal material onto the polished and dry-etched surface of the magnetic body including not only the ends of the coil but also the some of the exposed metal magnetic grains, to form an underlying layer continuously covering the polished and dry-etched surface of the magnetic body; and then forming a cover layer that covers an outer side of the underlying layer, to form terminal electrodes constituted by the underlying layer and the cover layer.

2. The method of manufacturing a coil component according to claim 1, further comprising a step to form a protective layer that covers the cover layer.

3. The method of manufacturing a coil component according to claim 1, wherein, where the underlying layer is in contact with the magnetic body, a ratio of areas where the underlying layer is in contact with the exposed metal magnetic grains is greater than a ratio of areas where the underlying layer is not in contact with the exposed metal magnetic grains.

4. The method of manufacturing a coil component according to claim 1, wherein the metal magnetic grains of the magnetic body include two or more types of metal magnetic grains of different grain sizes.

5. The method of manufacturing a coil component according to claim 1, wherein the metal material that forms the underlying layer contains one of Ag, Cu, Au, Al, Mg, W, Ni, Fe, Pt, Cr, and Ti.

6. The method of manufacturing a coil component according to claim 1, wherein the metal material that forms the underlying layer contains at least Ag or Cu.

7. The method of manufacturing a coil component according to claim 1, wherein the cover layer is formed with Ag or a conductive resin containing Ag.

8. The method of manufacturing a coil component according to claim 2, wherein the protective layer is formed with Ni and Sn.

9. The method of manufacturing a coil component according to claim 1, wherein, on a magnetic body surface where the terminal electrodes are not formed, phosphorus is contained at least in some areas of the surface of the magnetic body surface where the terminal electrodes are not formed.

10. The method of manufacturing a coil component according to claim 1, wherein, on a magnetic body surface where the terminal electrodes are not formed, at least some areas of the surface of the magnetic body surface where the terminal electrodes are not formed are covered with a resin that contains an oxide filler whose grain size is smaller than a grain size of the metal grains.

11. The method of manufacturing a coil component according to claim 1, wherein the dry-etching is an ion-milling or a plasma etching.

* * * * *